April 19, 1960  N. SOMACH  2,933,015
FOLDABLE STEREOSCOPE DEVICE FOR VIEWING
TRANSPARENCIES AND PRINTS Filed May 6, 1958   3 Sheets-Sheet 1

INVENTOR.
NORMAN SOMACH
BY
ATTORNEY

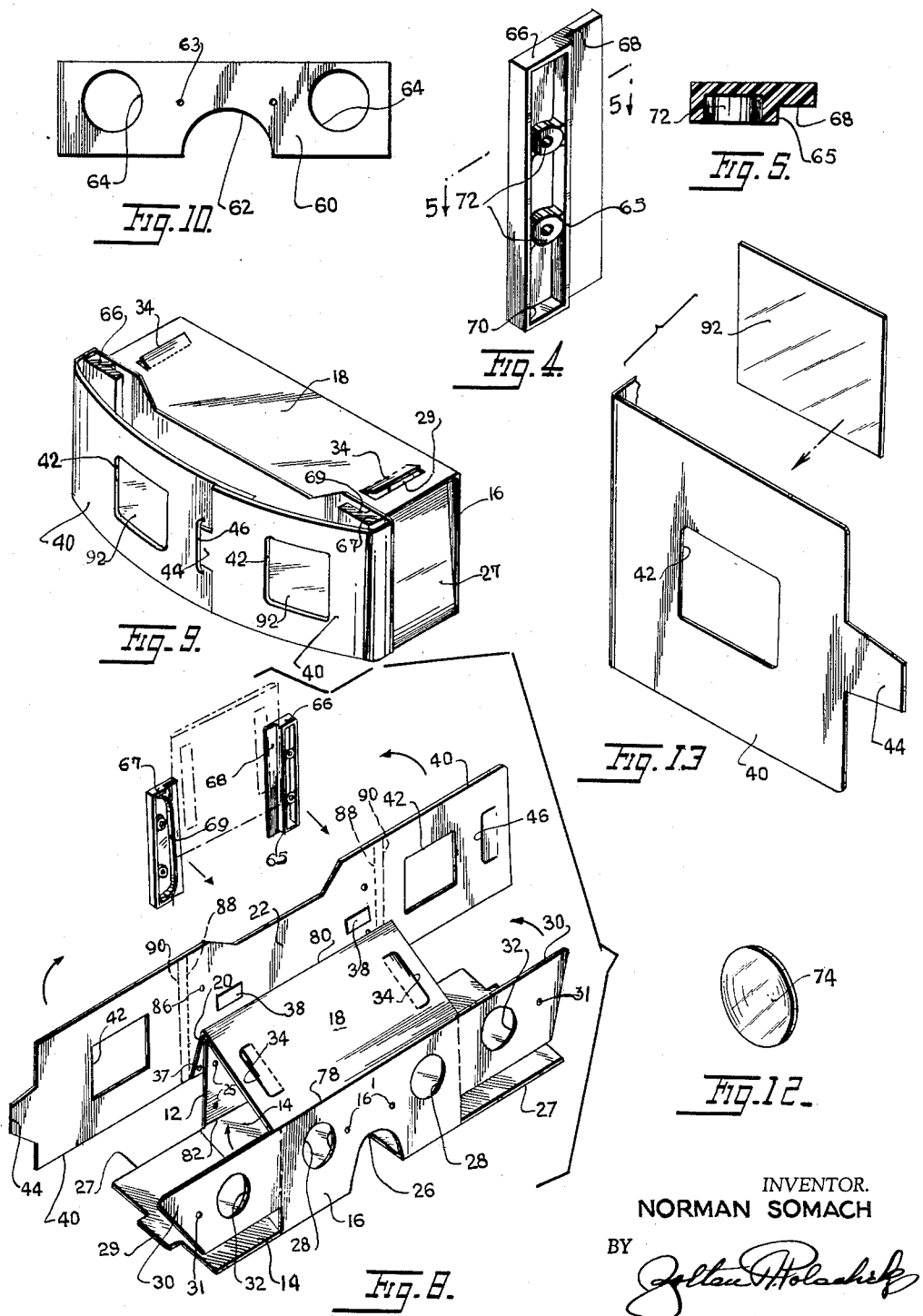

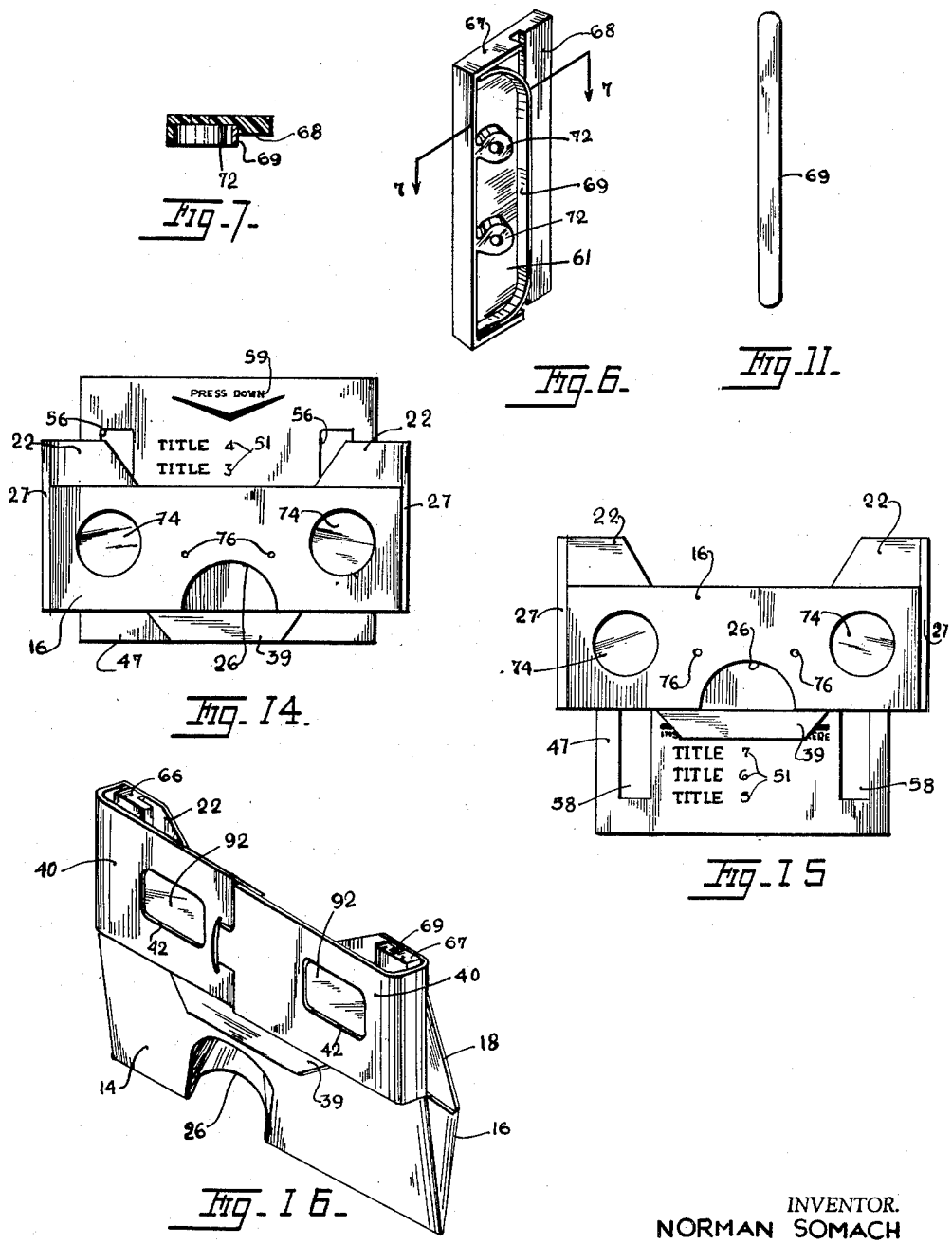

United States Patent Office 2,933,015
Patented Apr. 19, 1960

2,933,015

FOLDABLE STEREOSCOPE DEVICE FOR VIEWING TRANSPARENCIES AND PRINTS

Norman Somach, Allentown, Pa.

Application May 6, 1958, Serial No. 733,411

1 Claim. (Cl. 88—29)

This invention relates generally to stereoscopic viewers, and particularly to those devices falling within this category that are designed for viewing miniature film transparencies, and which are especially adapted to be folded.

In the design of such viewers, it is most important to provide means for achieving and maintaining precise alignment of the two optical axes, relative to each other, and between these optical axes and the two stereoscopic pictures in view; otherwise, visual discomfort and even an inability to fuse the two images is experienced by the observer.

The main object of the present invention is to provide a device of this nature, the design of which provides the necessary precision and alignment for comfortable and accurate viewing.

Another object is to provide a stereoscopic device having the above-mentioned characteristics, which device will be readily foldable, so that it can be utilized widely in the fields of commerce, advertising, entertainment and education by virtue of its economical construction, reliable optical precision, its suitability for mailing at low cost and ease of carrying and storage.

Another object is to provide a device of the character stated which utilizes a card carrier upon which a series of film transparencies are mounted.

Another object is to so form the device, that the card carrier may be moved therethrough in such a manner that the pairs of stereoscopic pictures are continually, accurately aligned with the optical axes of the viewing lenses; and are maintained in such alignment, free from tilting or accidental jarring when at rest within the device, as for example, when a particular pair of transparencies is being observed.

Another object is to provide a device of the character stated, which will be adapted for mounting the viewing lenses upon the body of the device in a manner such that the alignment of their optical axes is integrated with the alignment of the picture carrier.

Still another object is to insure that the transmitted light, by which the transparencies are illuminated during viewing, is diffused evenly and without granularity, which would decrease the illusion of reality, and diminish the clarity of the stereoscopic image.

Another object is to integrate the design of the physical structure of the viewing device with the layout and placement of picture titles upon the face of the film card, so that one using the device may easily and correctly associate the proper title with its respective picture, by virtue of its sole and immediate proximity to the body of the viewer device.

A further object is to provide such a device so designed as to achieve a maximum degree of economy and efficiency.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 4 is a perspective view, on an enlarged scale, of one of the guide blocks.

Fig. 5 is a transverse sectional view, on the same scale as Fig. 4, taken substantially on line 5—5 of Fig. 4.

Fig. 6 is a perspective view, on an enlarged scale, of another guide block, which also shows a simple leaf spring encased therein.

Fig. 7 is a transverse sectional view, on the same scale as Fig. 6, taken substantially on line 7—7 of Fig. 6.

Fig. 8 is a perspective view showing the device during the process of assembling same, parts being omitted.

Fig. 9 is a rear perspective view of the completed device.

Fig. 10 is a front elevational view of the lens mounting piece, used in this device.

Fig. 11 is a plan view, on an enlarged scale, of the guide block leaf spring.

Fig. 12 is an enlarged perspective view of a lens.

Fig. 13 is an enlarged perspective disassembled view showing a translucent panel and a wing which carries the panel.

Fig. 14 is a front elevational view, on a reduced scale, of the device with a film transparency mount inserted in one position.

Fig. 15 is another front elevational view, on a reduced scale, of the device with a film transparency mount inserted in a different position.

Fig. 16 is a perspective view of the viewer device, when in folded, collapsed condition.

Figure 1:
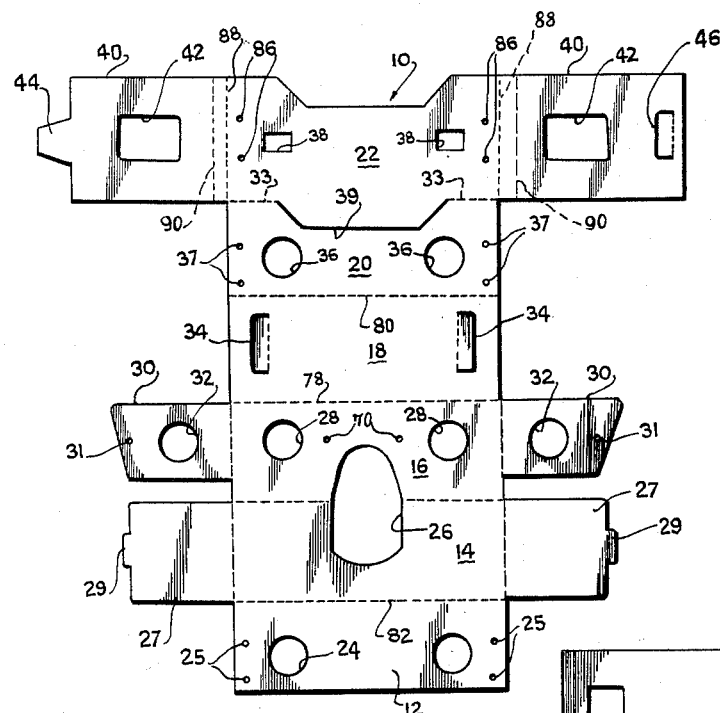
Fig. 1 is a plan view of the blank used in forming the viewer, in spread out formation.

Referring to the drawings in detail, designated generally at 10 is the blank from which the main body of the device is formed. This is formed from a single piece of relatively inexpensive, sturdy but readily foldable cardboard material, of comparatively small thickness, adapted to be die-cut or otherwise imparted the shape shown in Fig. 1.

The blank 10 includes a plurality of transversely elongated, integrally connected panels, which viewing same from one end to the other may be appropriately termed a first panel 12, a second panel 14, a third panel 16, a fourth panel 18, a fifth panel 20 and a sixth panel 22. Formed in the end portions of panel 12 are circular openings 24, adjacent which are small eyelet receiving holes 25. Panel 14 is extended laterally beyond the opposite ends of panel 12, to provide wings 27, formed with small ears 29. Centrally formed in the panel 14 is a large opening 26, which continues on into panel 16. Circular openings 28 are provided at opposite sides of the opening 26, as are eyelet receiving holes 70 in panel 16.

Wings 30 are formed on the opposite ends of the panel 16, said wings being slightly smaller in width than the width of the panel 16; the wings having oppositely beveled ends formed with eyelet holes 31. Circular openings 32 are formed in the wings 30.

C-shaped slits are cut into the end portions of the panel 18, said slits being identical but opposite, to define tabs 34, bendable out of the general plane of panel 18. Openings 36, of a circular form, are cut in the ends of the panel 20, each opening 36 being adjacent to a pair of eyelet receiving holes 37 adjacent the ends of the panel.

Panel 22, along its inner edge, has an elongated flap 39, cut from panel 20, and also formed in panel 22 are small, rectangular sight openings 38. Fold lines 33 are provided at opposite sides of the flap 39. Wings 40 are formed on the ends of panel 22, having large, rectangular openings 42. Adjacent to opening 42 of one wing, is a slit forming a tab 46. Upon the other wing 40, there is formed a projecting ear 44. Also formed in the end portions of panel 22, are eyelet receiving holes 86.

Figure 3:
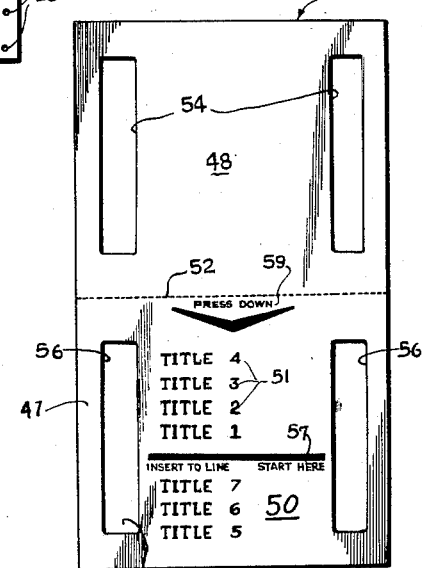
Fig. 3 is a plan view of the blank used in forming the card carrier, in spread out formation.

Designated at 47 is a rectangular blank for a film transparency mount, or carrier. Blank 47 is shown in Fig. 3, and comprises substantially identical portions 48 and 50, separated by a transverse fold line 52, and formed with pairs of elongated parallel openings 54, 56, respectively. A legend 57 is provided on the surface of portion 50, reading "insert to line" and further reading "start here." A legend 59, is also provided, reading "press down." Titles 51, corresponding to the several pictures, are further provided.

Mountable in the openings 54, 56 are strips of film 58, such as the standard sixteen millimeter film well known in the photographic arts, upon which a number of individual frames, or pictures, are disposed. It is understood that these are exactly positioned, and are so related, one to another, as to provide a stereoscopic picture in a manner well known in the art, when viewed through the lenses.

To mount the film, the film strips are disposed between the folded panels 48, 50, of the slide, the confronting faces of said panels being provided with a suitable adhesive, to connect the same to each other and to hold the film fixedly in place.

Referring to Fig. 10, designated at 60 is a flat lens mounting piece, having a nose receiving recess 62 disposed between circular openings 64. Adjacent to these are eyelet receiving holes 63. Preferably, this piece is made of fiberboard or stiff cardboard.

Referring to Figs. 4, 5, 6 and 7, a pair of rectangular guide blocks 66, 67, of molded plastic material and having confronting angular longitudinal recesses 68, serve to retain the film carrying card. The blocks are hollowed out and have perforated reinforcing portions 72, to support eyelets by which the blocks are ultimately registered and secured to the body of the viewer.

Referring to Fig. 4, particularly, in block 66 a longitudinal gib 65 serves as a track against which one lateral edge of the film card bears, and is thereby aligned.

Referring to Fig. 6 partciularly, block 67 is formed with a hollowed out section 61, designed to receive and retain a simple leaf spring 69. This spring supplies tension against another lateral edge of the film card, sufficient to keep the opposite lateral edge bearing upon the gib 65, thereby maintaining the alignment of the card and supporting the card upon the body of the viewer.

Designated at 74 in Fig. 12 is a lens formed of glass or other suitable lens material. Two of these would be provided, and these would be tightly pressed and fixedly mounted in the openings 64, of the lens mounting piece 60.

It is appropriate now to consider the manner in which the device is assembled.

As a first step, the lens mount piece 60, with the lenses therein mounted, is positioned under panel 16, and the flaps 30 of panel 16 are bent in back of panel 16 in a direction shown by the arrows in Fig. 8. This would be done, usually, before any other folding of the blank 10; in fact, before the blank is folded to the extent shown in Fig. 8.

Then, eyelets 76 are extended through the registering small holes 63 of piece 60 and holes 70 of panel 16, to secure the panel to the lens mount piece and to the flaps extending in back of the mount piece. This provides precise alignment of the optical axes of the lenses, with the main body of the viewer.

The device is then folded in the manner shown to best advantage in Fig. 8. Panel 16 is a front panel, and panel 18 is folded rearwardly, as shown in Fig. 8, to provide the top panel of the device, being folded along a line 78. Panel 20 is folded downwardly along a line 80, in back of panel 12, which was folded upwardly along a line 82, along which it is connected to the panel 14, which becomes the bottom panel of the viewing chamber.

Panel 22 is folded along line 33 against the back surface of panel 20. Flap 39, as a result, extends downwardly from line 33, and below panel 14, as can be seen in Fig. 14.

As previously noted, the wings 30 would not be in the position shown in Fig. 8, but, rather, would have been previously folded back and eyeleted to the back surface of the body portion of panel 16.

Now, eyelets pass through the perforated portions 72 of the plastic blocks and through the holes 86 of panel 22, holes 37 of panel 20 and holes 25 of panel 12, thereby registering and aligning the blocks with the body of the viewer and fastening the several panels into a box-like structure.

Wings 27 on panel 14 may then be folded upwardly to close the viewing chamber at its opposite sides, and ears 29 are inserted through and interlocked with the tab-forming slits 34 in panel 18. This is shown in Fig. 2 to particular advantage.

Now the wings 40 are folded rearwardly along fold lines 88, 90, to their Fig. 9 positions, with ear 44 engaging in slit 46. As can be seen, these wings when folded comprise a panel curving backwardly, and away from the main portion of the viewer body. In this way the light diffusing sheets carried thereon are positioned out of the plane of sharp focus of the lenses, and the light transmitted therethrough becomes an evenly diffuse, grainless field of illumination.

Designated at 92 is a rectangular, thin sheet or panel of plastic. This is of colorless, matte-surfaced translucent properties, being, in effect, a diffusing light admitting window. This sheet is adhesively secured in place over each opening 42, in a preliminary stage of manufacture of the device.

Figure 2:
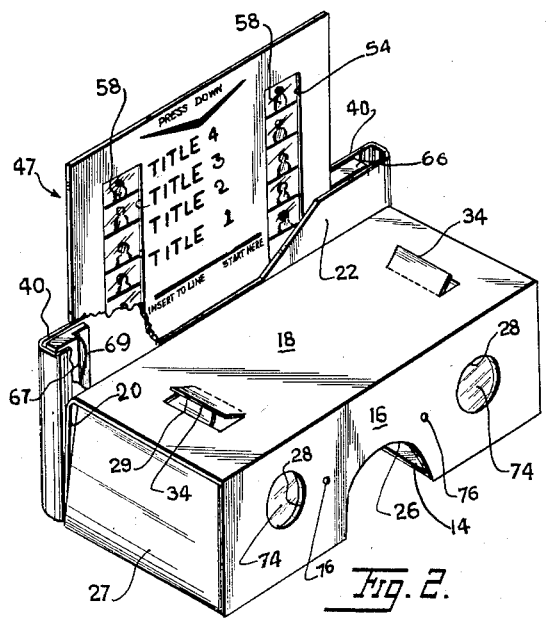
Fig. 2 is a perspective view of the completed viewer, embodying the invention, with a film transparency mount or carrier inserted, parts being broken away.

There is defined, between the plastic block recesses 68 and the back of panel 22, a space into which the card 47 is admitted, as shown in Fig. 2. This card slides longitudinally through this space, one lateral edge being supported and aligned by the track 65, and the opposite lateral edge supported under tension by the leaf spring 69.

In use of the device, one positions the panel 16 against the face, with opening 26 providing a recess to receive one's nose. The eyes are disposed to look through the lenses 74, and one sees, in a magnified condition, a rectangular window illuminated by light, which light, of course, passes through the panels 92 in openings 42.

The film card is now inserted and pressed down, within the defined spaceway, to the starting line 57. The result is that one sees a single, fused, stereoscopic picture.

Of course, the stereoscopic viewing principles which produce a fused three-dimensional image is very old, and comprises no part, in and of itself, of the present invention.

When the first of the series of pictures is in view, as shown in Fig. 2, the title upon the face of the film card appropriate to that first picture, is directly adjacent and just above the plane surface of panel 18.

By further pressing down of the film card, other pictures come into view. It is noteworthy that the user need not continue to handle or otherwise support the film card, during viewing, as it is firmly and precisely supported by the spring 69 and the track 65.

In consecutive order, the titles appropriate to several of the other pictures assume the position adjacent to panel 18. It will be noted in Fig. 14 that when a midway located picture is in view, with its title, herein shown as "Title 4," adjacent to panel 18, the bottom edge of the film card is horizontally in line with the bottom edge of flap 39. Ultimately, as noted in Fig. 15, the top edge of the film card is depressed until it is horizontally in line with the surface of panel 18, whereupon the last of the series of pictures is in view, and the related title, herein shown as "Title 7," is positioned just below and adjacent to flap 39.

Appropriate titles, in summary, occupy a position adjacent to either panel 18 or flap 39.

By reason of the invention, great economy and efficiency is achieved, with the device meeting all the objects stated previously herein. These objects need not be restated at this point as advantages, and it is sufficient to note that all the objects are achieved by a device formed and assembled as previously illustrated and described.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

In a foldable stereoscopic device, a generally rectangular box-like housing having top, bottom, front and a plurality of superimposed rear walls, the bottom and front walls having communicating nose recesses along adjacent long edges thereof, the top wall having slits adjacent its ends, the bottom wall having flaps foldably hinged to the end edges thereof and foldable across the space between the ends of the walls, said bottom wall flaps having tabs on the ends thereof in interlocking engagement with the slits in the top wall, said front wall having spaced lens-receiving openings therein, said front wall having end wings foldable thereover, said end wings having openings registering with the lens-receiving openings in the front wall, a pair of lenses in said lens-receiving openings, the rearmost rear wall having a pair of light transmission openings in register with the lens-receiving openings in the front wall, said rearmost rear wall having end wings foldable thereover, the other rear walls having spaced light transmission openings in register with the lens-receiving openings in the front wall, said last-named wings having spaced light transmission openings registering with the openings in the rearmost rear wall, one of the wings on said rearmost rear wall having a tab at the end thereof, the other of said wings on said rearmost rear wall having a slit to interlockingly receive said tab to secure said last-named wings in said overlapping relation and to define a receptacle for receiving and supporting a stereoscopic slide between said rearmost rear wall and the wings on said rearmost rear wall, in line with said light transmission openings, the penultimate rear wall having a slit adjacent the rearmost rear wall whereby the stereoscopic slide is adapted to move bodily through the housing, for indexing the titles on the stereoscopic slide and whereby the rearmost rear wall is provided with a bottom indexing flap.

References Cited in the file of this patent
UNITED STATES PATENTS

| | | |
|---|---|---|
| 2,190,646 | Branson | Feb. 20, 1940 |
| 2,674,920 | Bennett | Apr. 13, 1954 |
| 2,724,991 | Levine | Nov. 29, 1955 |
| 2,768,554 | Leslie | Oct. 30, 1956 |
| 2,789,460 | Kaufman | Apr. 23, 1957 |
| 2,794,367 | Turner | June 4, 1957 |
| 2,872,844 | Van Tuyl | Feb. 10, 1959 |